(12) United States Patent
Meng

(10) Patent No.: US 12,337,766 B2
(45) Date of Patent: Jun. 24, 2025

(54) MAGNETIC ROTARY BUCKLE TYPE VEHICLE-MOUNTED HOLDER

(71) Applicant: SHENZHEN ILLUSDESIGN CREATIVE CO., LTD., Guangdong (CN)

(72) Inventor: Yule Meng, Guangdong (CN)

(73) Assignee: SHENZHEN ILLUSDESIGN CREATIVE CO., LTD., Shenzhen (CN)

( * ) Notice: Subject to any disclaimer, the term of this patent is extended or adjusted under 35 U.S.C. 154(b) by 272 days.

(21) Appl. No.: 18/198,269

(22) Filed: May 16, 2023

(65) Prior Publication Data

US 2024/0262298 A1 Aug. 8, 2024

(30) Foreign Application Priority Data

Feb. 7, 2023 (CN) .......................... 202320242373.4

(51) Int. Cl.
*B60R 11/02* (2006.01)
*B60R 11/00* (2006.01)

(52) U.S. Cl.
CPC ..... *B60R 11/0241* (2013.01); *B60R 2011/007* (2013.01)

(58) Field of Classification Search
CPC ................. H04M 1/04; B60R 11/0241; B60R 2011/007; B60R 11/02
See application file for complete search history.

(56) References Cited

U.S. PATENT DOCUMENTS

2020/0328017 A1* 10/2020 Isenberg ............. B60R 11/0241

* cited by examiner

*Primary Examiner* — Tuan D Nguyen

(57) ABSTRACT

Disclosed is a magnetic rotary buckle type vehicle-mounted holder, including: a face shell, a lock catch and a magnet, and a mobile phone shell. The lock catch and the magnet are mounted on an upper part of the face shell; a through hole is formed in the mobile phone shell; a buckle is provided on an inner side wall of the through hole; a magnetic plate is provided on a back surface of the mobile phone shell; after the mobile phone shell sleeves on the lock catch through the through hole and rotates for a preset angle, the buckle is connected with the lock catch in a clamping manner; and the back surface of the mobile phone shell is tightly attached to the face shell through the magnetic plate and the magnet adsorption. The stability of connection between the mobile phone shell and the face shell can be effectively improved.

10 Claims, 7 Drawing Sheets

MAGNETIC ROTARY BUCKLE TYPE VEHICLE-MOUNTED HOLDER

CROSS REFERENCE TO RELATED APPLICATIONS

The present application claims the benefit of Chinese Patent Application No. 202320242373.4 filed on Feb. 7, 2023, the contents of which are incorporated herein by reference in their entirety.

TECHNICAL FIELD

This application relates to the technical field of vehicle-mounted devices, and in particular, to a magnetic rotary buckle type vehicle-mounted holder.

BACKGROUND

To facilitate the driving safety, a vehicle-mounted holder is usually mounted on a central console of a vehicle at present, so as to facilitate the placement of a mobile phone.

The existing vehicle-mounted holder usually clamps the mobile phone through an elastic clamping jaw or adsorbs the mobile phone through a magnet. However, a problem of loosening is prone to occur after the mobile phone is fixed with the elastic clamping jaw, and therefore, it is difficult to ensure the stability of fixing the mobile phone and there is also a problem that the mobile phone is inconvenient to take and place. Although the convenience of fixing the mobile phone can be improved in a magnet adsorption manner, the stability of fixing the mobile phone is also difficult to ensure only through the magnet adsorption.

Therefore, how to provide a vehicle-mounted holder capable of improving the stability of fixing the mobile phone is a technical problem urgently needing to be solved by a person skilled in the art.

SUMMARY

This application is intended to provide a magnetic rotary buckle type vehicle-mounted holder, which can effectively improve the stability of fixing a mobile phone.

To achieve the foregoing objective, this application provides the following technical solutions:

A magnetic rotary buckle type vehicle-mounted holder includes: a face shell, a lock catch and a magnet, and a mobile phone shell; the lock catch and the magnet are mounted on an upper part of the face shell; a through hole is formed in the mobile phone shell; a buckle is provided on an inner side wall of the through hole; a magnetic plate is provided on a back surface of the mobile phone shell; after the mobile phone shell sleeves on the lock catch through the through hole and rotates for a preset angle, the buckle is connected with the lock catch in a clamping manner; and the back surface of the mobile phone shell is tightly attached to an upper surface of the face shell through the magnetic plate and the magnet adsorption.

Preferably, the magnetic rotary buckle type vehicle-mounted holder further includes a base and a damping sheet; the damping sheet is connected to a lower end of the face shell; the base is internally provided with a plurality of clamping grooves distributed along a circumferential direction; a protrusion clamped into the clamping grooves is provided on an outer side of the damping sheet; and when the face shell is subjected to a rotating force, the protrusion of the damping sheet is elastically deformed, so as to be detached from the previously clamped clamping grooves and clamped into the adjacent clamping grooves.

Preferably, the base is provided with an annular protrusion extending upward, and the clamping grooves are formed in an inner side of the annular protrusion; an accommodating cylinder extending downward is provided at the lower end of the face shell; the accommodating cylinder is located in the annular protrusion; the damping sheet is located in the accommodating cylinder; and a receding hole for the protrusion to stretch out is formed in a side wall of the accommodating cylinder.

Preferably, the magnetic rotary buckle type vehicle-mounted holder further includes a spring; two ends of the spring abut against the face shell and the base, respectively; the bottom of the face shell is provided with a plurality of open grooves distributed along the circumferential direction; the upper end of the annular protrusion is provided with a plurality of clamping posts corresponding to the open grooves one by one; the face shell makes the open grooves be detached from the clamping posts from bottom to top under the action of elasticity of the spring; and when the face shell is pressed, the clamping posts stretch into the open grooves to limit the rotation of the face shell relative to the base.

Preferably, the lower end of the face shell is provided with a first guide cylinder extending downward; the upper end of the base is provided with a second guide cylinder extending upward; the second guide cylinder sleeves inside the first guide cylinder; the first guide cylinder can rotate relative to the second guide cylinder or move axially; the annular protrusion is located at the inner side of the second guide cylinder; and the spring is located in a space between the annular protrusion and the second guide cylinder.

Preferably, the adjacent clamping grooves are in circular arc transition.

Preferably, a guide hole is formed in the bottom of the face shell; an inner guide cylinder extending upward is provided on a middle part of the base; and the face shell sleeves on the inner guide cylinder through the guide hole.

Preferably, the magnetic rotary buckle type vehicle-mounted holder further includes a fastener; the fastener is used for penetrating into the inner guide cylinder; and a limiting part is provided at the outer side of the upper end of the fastener to limit the detachment of the face shell from the inner guide cylinder.

Preferably, the face shell includes an upper cover and a bottom plate; the upper cover covers and is fixed on the bottom plate; and the magnet is provided on an inner surface of the top of the upper cover.

Preferably, the face shell is provided with at least one marble protruding upward, and the magnetic plate is provided with positioning holes for clamping the marbles.

Compared with the prior art, the technical solutions above have the following advantages:

The magnetic rotary buckle type vehicle-mounted holder provided by this application includes: a face shell, a lock catch and a magnet, and a mobile phone shell. The lock catch and the magnet are mounted on an upper part of the face shell; a through hole is formed in the mobile phone shell; a buckle is provided on an inner side wall of the through hole; a magnetic plate is provided on a back surface of the mobile phone shell; after the mobile phone shell sleeves on the lock catch through the through hole and rotates for a preset angle, the buckle is connected with the lock catch in a clamping manner; and the back surface of the mobile phone shell is tightly attached to an upper surface of the face shell through the magnetic plate and the magnet adsorption. The stability of connection between the mobile phone shell and the face shell can be effectively improved in a connection manner combining clamping and the magnet adsorption.

BRIEF DESCRIPTION OF THE DRAWINGS

To describe the technical solutions in embodiments of this application or in existing technologies more clearly, the accompanying drawings required for describing the embodiments or existing technologies are briefly described below. Apparently, the accompanying drawings in the following description merely show the embodiments of this application, and a person of ordinary skill in the art may still derive other drawings from accompanying drawings provided without creative efforts.

Figure 1:
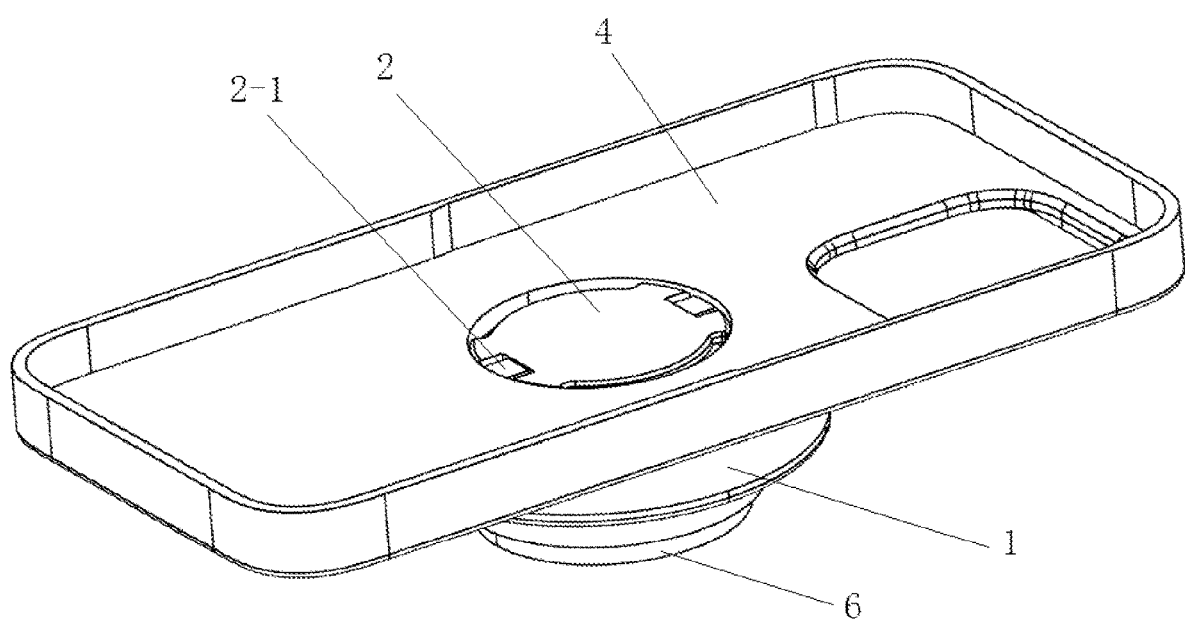
FIG. 1 is a perspective view of a magnetic rotary buckle type vehicle-mounted holder.
Figure 2:
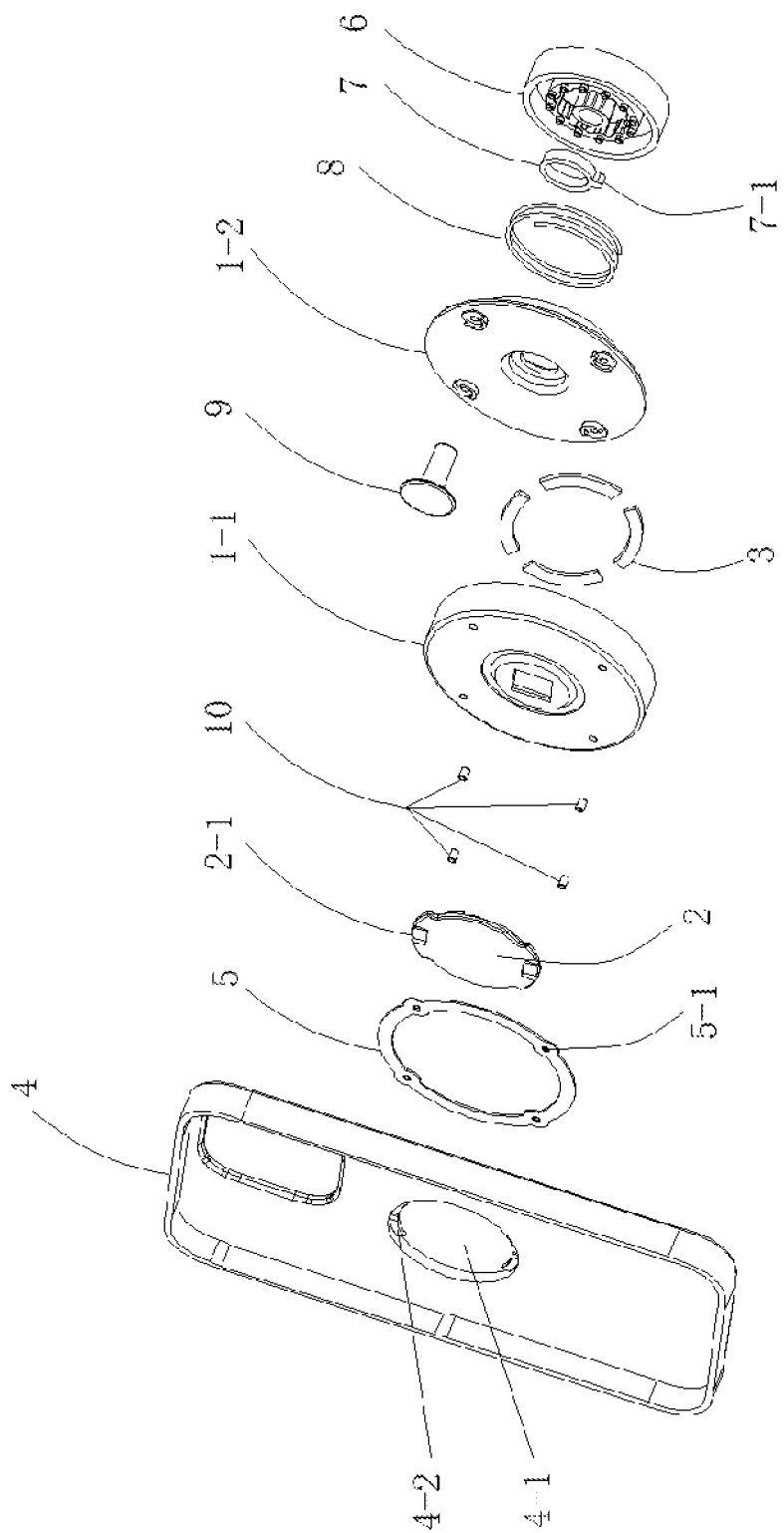
FIG. 2 is an exploded view of a magnetic rotary buckle type vehicle-mounted holder.

Reference numerals in the drawings are as follows:
1: face shell; 1-1: upper cover; 1-2: bottom plate; 1-3: accommodating cylinder; 1-4: first guide cylinder; 1-5: annular flange; 1-6: open groove; 1-7: guide hole;
2: lock catch; 2-1: clamping block; 2-1-1: clamping point; 2-1-2: strip groove;
3: magnet; 4: mobile phone shell; 4-1: through hole; 4-2: buckle; 5: magnetic plate; 5-1: positioning hole; 6: base; 6-1: annular protrusion; 6-1-1: clamping groove; 6-1-2: clamping post; 6-2: second guide cylinder; 6-3: inner guide cylinder; 7: damping sheet; 7-1: protrusion; 8: spring; 9: screw; and 10: marble.

DETAILED DESCRIPTION

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Figure 3:
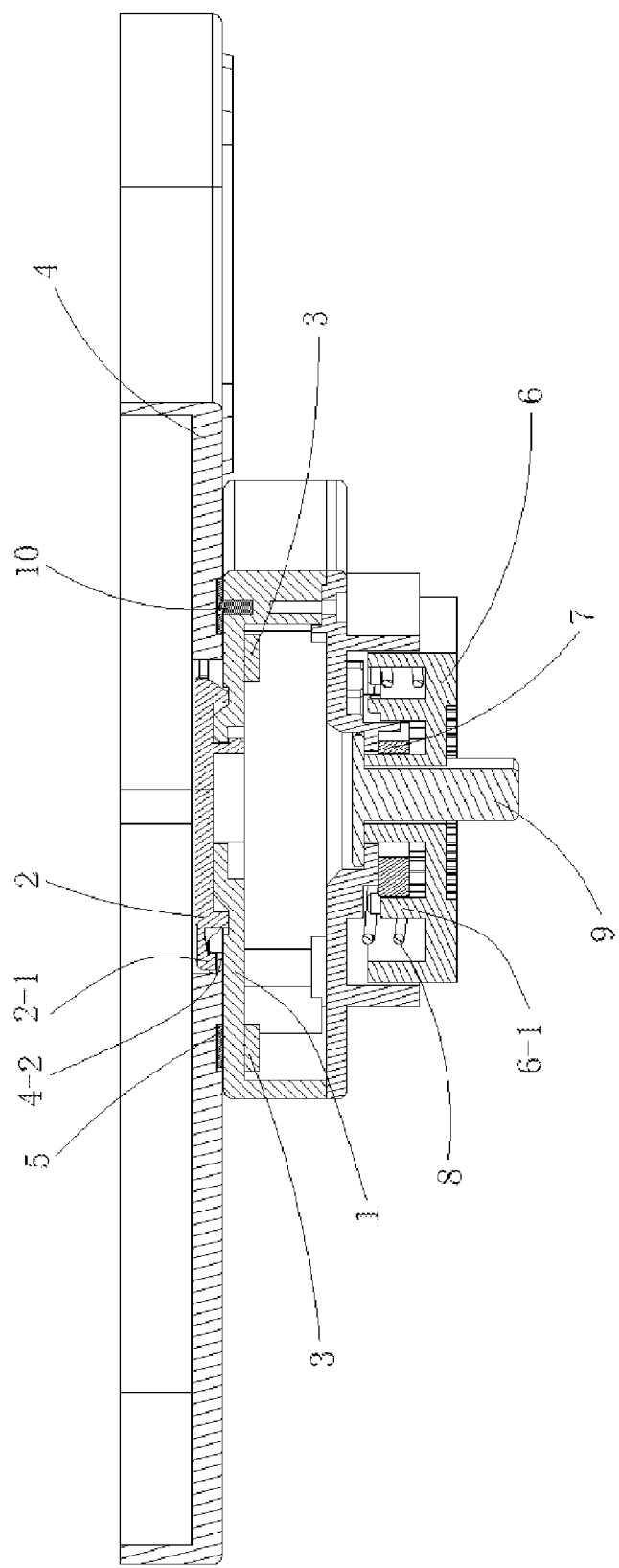
FIG. 3 is a cross-sectional view of a magnetic rotary buckle type vehicle-mounted holder.
Figure 4:
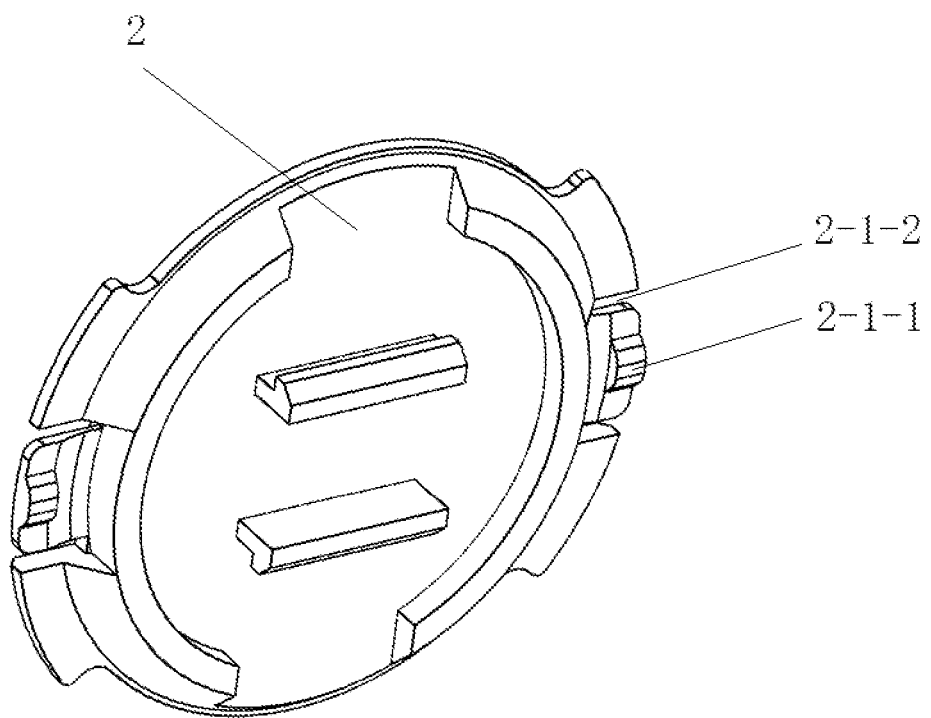
FIG. 4 is a schematic structural diagram of the bottom of a lock catch.

Please refer to FIGS. 1 to 7. A magnetic rotary buckle type vehicle-mounted holder provided by an embodiment of this application includes: a face shell 1, a lock catch 2 and a magnet 3, and a mobile phone shell 4. The lock catch 2 and the magnet 3 are mounted on an upper part of the face shell 1. A through hole 4-1 is formed in the mobile phone shell 4. A buckle 4-2 is provided on an inner side wall of the through hole 4-1. With respect to a specific structure of the buckle 4-2, an arc-shaped protrusion 7-1 extending inward may be provided on the inner side wall of the through hole 4-1. A groove is formed above the arc-shaped protrusion 7-1, where two arc-shaped protrusions 7-1 may be symmetrically provided inside the through hole 4-1. With respect to a specific structure of the lock catch 2, as shown in FIG. 4, the lock catch 2 includes a circular disc. A lower end of the circular disc is fixed on the face shell 1, and can specifically be connected in a clamping manner. A clamping block 2-1 extending outward is provided on a side of the circular disc, where two clamping blocks 2-1 can be symmetrically provided on the circular disc. A clamping point 2-1-1 used for being clamped into the groove is arranged at the bottom of a tail end of the clamping block 2-1. The maximum length between the tail ends of the two clamping blocks 2-1 is not greater than an inner diameter of the through hole 4-1, but is greater than a distance between the two arc-shaped protrusions 7-1. An outer diameter of the circular disc is not greater than the distance between the two arc-shaped protrusions 7-1, where in order to conveniently clamp the clamping points 2-1-1 into the groove, two strip grooves 2-1-2 can be provided on the clamping block 2-1 to divide the clamping block 2-1 into three parts. The clamping point 2-1-1 is located at the bottom of the middle part of the clamping block 2-1, and the clamping block 2-1 is easy to elastically deform through the strip grooves 2-1-2. A magnetic plate 5 is provided on a back surface of the mobile phone shell 4. After the mobile phone shell 4 sleeves on the lock catch 2 through the through hole 4-1 and rotates for a preset angle, the buckle 4-2 is connected with the lock catch 2 in a clamping manner. The back surface of the mobile phone shell 4 is tightly attached to an upper surface of the face shell 1 through the magnetic plate 5 and the magnet 3 adsorption, where the face shell 1 includes an upper cover 1-1 and a bottom plate 1-2. The upper cover 1-1 covers and is fixed on the bottom plate 1-2. The magnet 3 is provided on an inner surface of the top of the upper cover 1-1. The magnet 3 is convenient to assemble by setting the face shell 1 into a split structure. The stability of connection between the mobile phone shell 4 and the face shell 1 can be effectively improved in a connection manner combining clamping and the magnet 3 adsorption.

Figure 7:
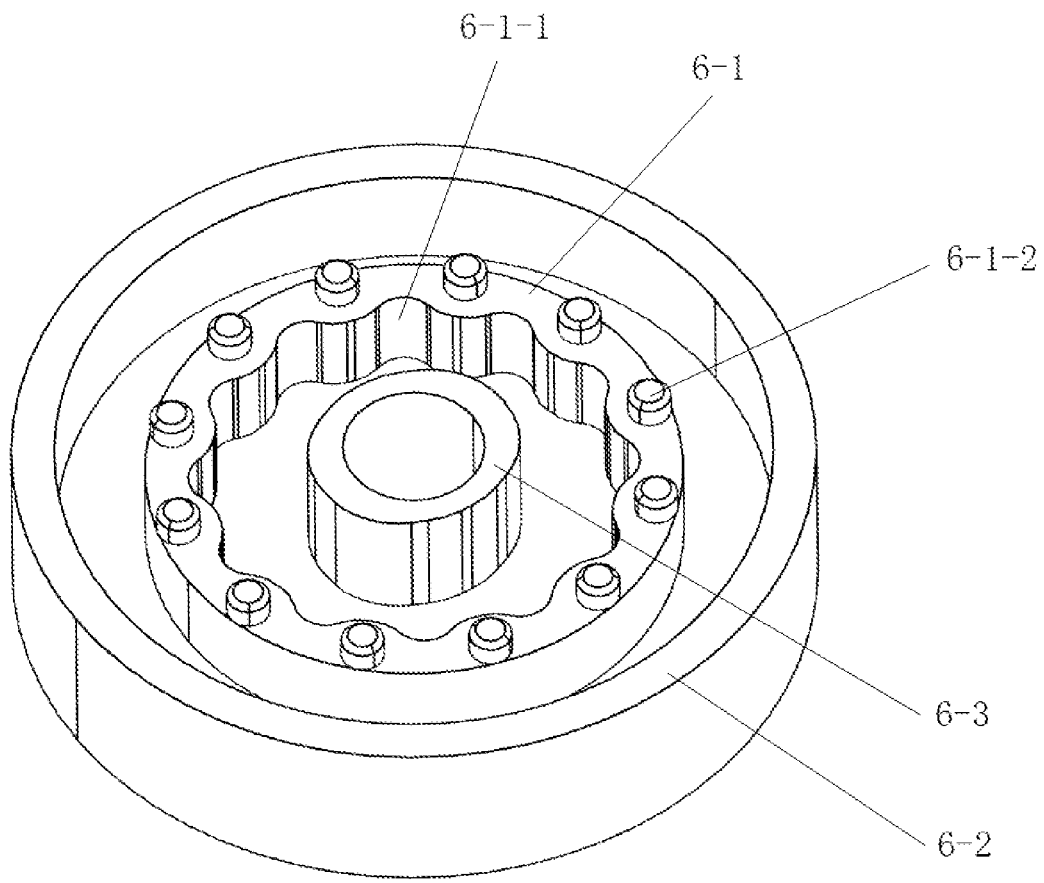
FIG. 7 is a schematic structural diagram of a base.

In some embodiments of this application, the magnetic rotary buckle type vehicle-mounted holder further includes a base 6 and a damping sheet 7. The damping sheet 7 is connected to a lower end of the face shell 1. The base 6 is fixed on an attached object, for example, fixed on a central console in a vehicle. As shown in FIG. 7, the base 6 is internally provided with a plurality of clamping grooves 6-1-1 distributed along a circumferential direction. A protrusion 7-1 clamped into the clamping grooves 6-1-1 is provided on an outer side of the damping sheet 7. When the face shell 1 is subjected to a rotating force, the protrusion 7-1 of the damping sheet 7 is elastically deformed, so as to be detached from the previously clamped clamping grooves 6-1-1 and clamped into the adjacent clamping grooves 6-1-1. The adjacent clamping grooves 6-1-1 are in circular arc transition, so as to facilitate the rotation of the damping sheet 7 relative to the base 6.

Figure 5:
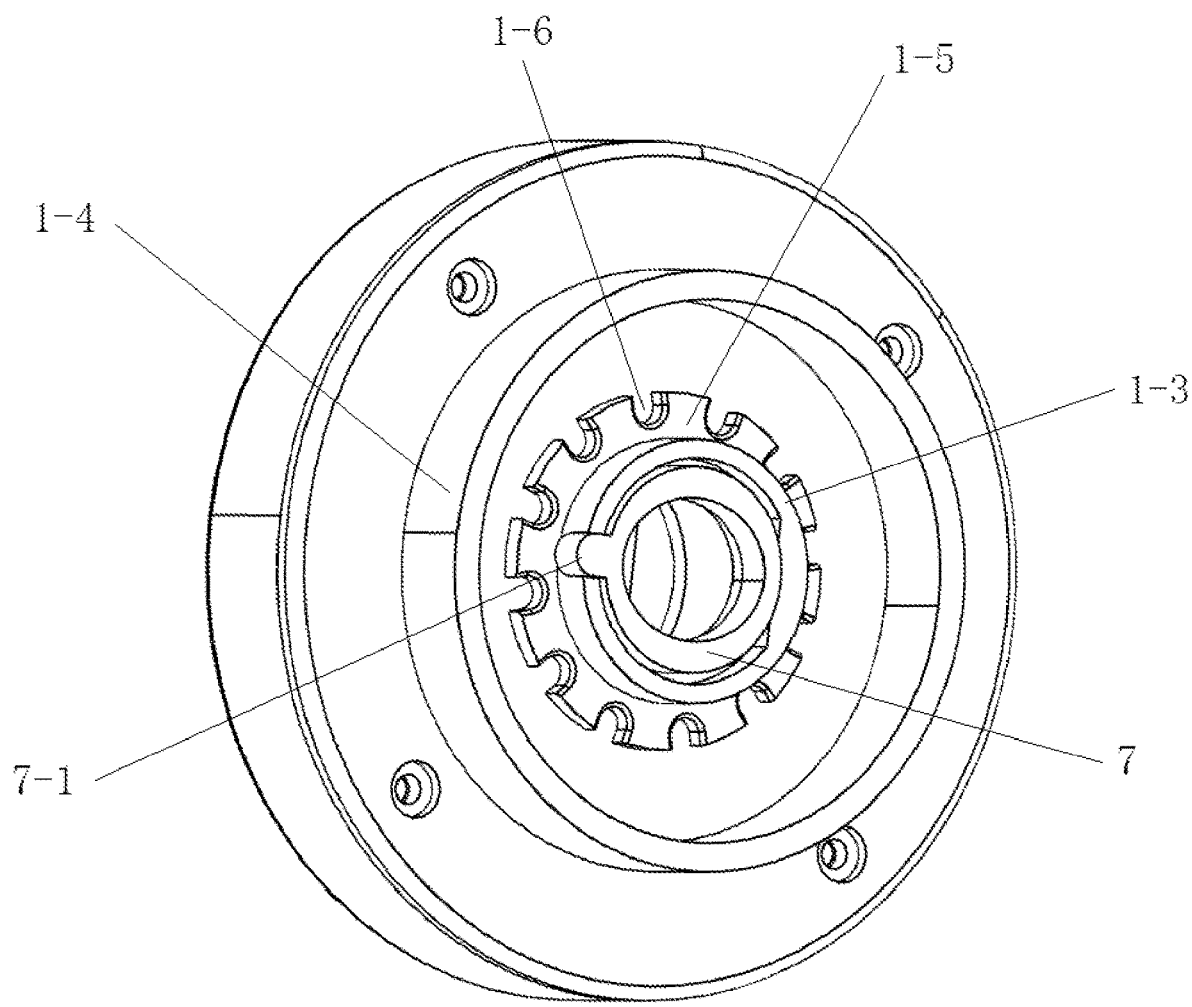
FIG. 5 is a schematic structural diagram of a face shell and a damping sheet.
Figure 6:
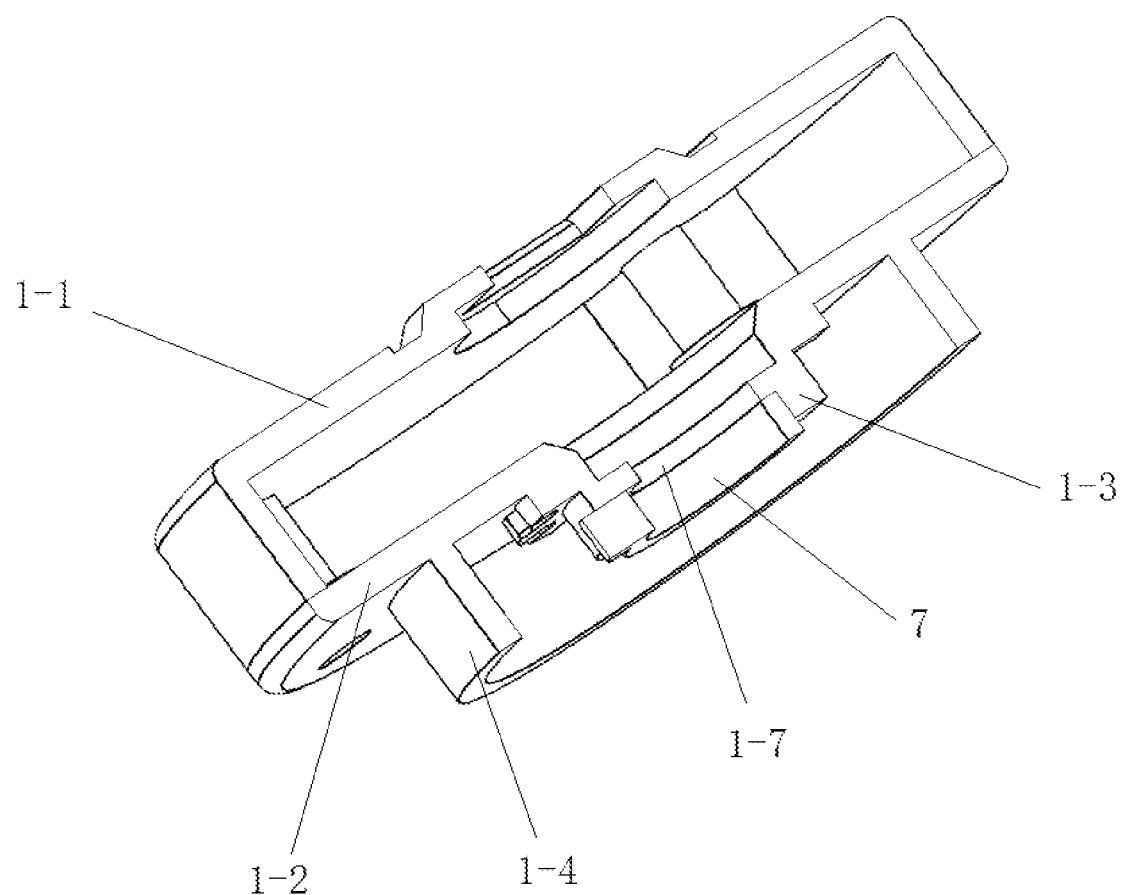
FIG. 6 is a schematic cross-sectional view of FIG. 5.

In some embodiments of this application, as shown in FIG. 7, the base 6 is provided with an annular protrusion 6-1 extending upward, and the clamping grooves 6-1-1 are formed in an inner side of the annular protrusion 6-1. As shown in FIG. 5 and FIG. 6, an accommodating cylinder 1-3 extending downward is provided at the lower end of the face shell 1. The accommodating cylinder 1-3 is located in the annular protrusion 6-1. The damping sheet 7 is located in the accommodating cylinder 1-3. A receding hole for the protrusion 7-1 to stretch out is formed in a side wall of the accommodating cylinder 1-3. During assembling, the protrusion 7-1 on the damping sheet 7 is aligned with the receding hole, and then the damping sheet 7 is placed in the accommodating cylinder 1-3 from bottom to top, where the damping sheet 7 is fixed relative to the accommodating cylinder 1-3.

In some embodiments of this application, as shown in FIG. 3, the magnetic rotary buckle type vehicle-mounted holder further includes a spring 8. Two ends of the spring 8 abut against the face shell 1 and the base 6, respectively. The bottom of the face shell 1 is provided with a plurality of open grooves 1-6 distributed along the circumferential direction. Specifically, an annular flange 1-5 can be provided at one end, close to the bottom of the face shell 1, on the accommodating cylinder 1-3. The open grooves 1-6 are provided on the outer side wall of the annular flange 1-5. The upper end of the annular protrusion 6-1 is provided with a plurality of clamping posts 6-1-2 corresponding to the open grooves 1-6 one by one. The face shell 1 makes the open grooves 1-6 be detached from the clamping posts 6-1-2 from bottom to top under the action of elasticity of the spring 8. At this time, the face shell 1 can be rotated. When the face shell 1 is pressed, the clamping posts 6-1-2 stretch into the open grooves 1-6 to limit the rotation of the face shell 1 relative to the base 6.

In some embodiments of this application, as shown in FIG. 5 and FIG. 6, the lower end of the face shell 1 is provided with a first guide cylinder 1-4 extending downward. The upper end of the base 6 is provided with a second guide cylinder 6-2 extending upward. The second guide cylinder 6-2 sleeves inside the first guide cylinder 1-4. The first guide cylinder 1-4 can rotate relative to the second guide cylinder 6-2 or move axially. The stability of the movement of the face shell 1 relative to the base 6 can be improved through the first guide cylinder 1-4 and the second guide cylinder 6-2. The annular protrusion 6-1 is located at the inner side of the second guide cylinder 6-2. The spring 8 is located in a space between the annular protrusion 6-1 and the second guide cylinder 6-2.

Further, a guide hole 1-7 is formed in the bottom of the face shell 1, as shown in FIG. 6. Preferably, the guide hole 1-7 is a counter bore. An inner guide cylinder 6-3 extending upward is provided on a middle part of the base 6. The face shell 1 sleeves on the inner guide cylinder 6-3 through the guide hole 1-7. Moreover, the magnetic rotary buckle 4-2 vehicle-mounted holder further includes a fastener. The fastener is used for penetrating into the inner guide cylinder 6-3 to fix the base 6 on the attached object. A limiting part is provided at the outer side of the upper end of the fastener to limit the detachment of the face shell 1 from the inner guide cylinder 6-3. Preferably, the fastener is a screw 9 and the upper end of the screw 9 is located inside the counter bore.

In some embodiments of this application, the face shell 1 is provided with at least one marble 10 protruding upward, and the magnetic plate 5 is provided with positioning holes 5-1 for clamping the marbles 10. After the mobile phone shell 4 sleeves on the lock catch 2 through the through hole 4-1, the face shell 1 is rotated to mutually connect the buckle 4-2 with the lock catch 2 in a clamping manner. At this time, the marbles 10 are clamped into the positioning holes 5-1 on the magnetic plate 5 and make a sound to remind a user that the mobile phone shell 4 has been fixed in place.

The embodiments in this specification are all described in a progressive manner. Description of each of the embodiments focuses on differences from other embodiments, and reference may be made to each other for the same or similar parts among the embodiments.

The magnetic rotary buckle type vehicle-mounted holder provided by this application is described in detail above. Specific examples are used herein for elaborating the principles and implementations of this application. The description of the foregoing embodiments is merely intended to help understand the method and core principles of this application. It should be noted that a person of ordinary skill in the art can also make several improvements and modifications on this application without departing from the principle of this application. All such modifications and modifications shall also fall within the protection scope of this application.

What is claimed is:

1. A magnetic rotary buckle type vehicle-mounted holder, comprising: a face shell (1), a lock catch (2) and a magnet (3), and a mobile phone shell (4); the lock catch (2) and the magnet (3) being mounted on an upper part of the face shell (1); a through hole (4-1) being formed in the mobile phone shell (4); a buckle (4-2) being provided on an inner side wall of the through hole (4-1); a magnetic plate (5) being provided on a back surface of the mobile phone shell (4); after the mobile phone shell (4) sleeves on the lock catch (2) through the through hole (4-1) and rotates for a preset angle, the buckle (4-2) being connected with the lock catch (2) in a clamping manner; and the back surface of the mobile phone shell (4) being tightly attached to an upper surface of the face shell (1) through the magnetic plate (5) and the magnet (3) adsorption.

2. The magnetic rotary buckle type vehicle-mounted holder according to claim 1, further comprising a base (6) and a damping sheet (7); the damping sheet (7) being connected to a lower end of the face shell (1); the base (6) being internally provided with a plurality of clamping grooves (6-1-1) distributed along a circumferential direction; a protrusion (7-1) clamped into the clamping groove (6-1-1) being provided on an outer side of the damping sheet (7); and when the face shell (1) is subjected to a rotating force, the protrusion (7-1) of the damping sheet (7) being elastically deformed, so as to be detached from the previously clamped clamping groove (6-1-1) and clamped into the adjacent clamping groove (6-1-1).

3. The magnetic rotary buckle type vehicle-mounted holder according to claim 2, wherein the base (6) is provided with an annular protrusion (6-1) extending upward, and the clamping grooves (6-1-1) are formed in an inner side of the annular protrusion (6-1); an accommodating cylinder (1-3) extending downward is provided at the lower end of the face shell (1); the accommodating cylinder (1-3) is located in the annular protrusion (6-1); the damping sheet (7) is located in the accommodating cylinder (1-3); and a receding hole for the protrusion (7-1) to stretch out is formed in a side wall of the accommodating cylinder (1-3).

4. The magnetic rotary buckle type vehicle-mounted holder according to claim 3, further comprising a spring (8); two ends of the spring (8) abutting against the face shell (1) and the base (6), respectively; the bottom of the face shell (1) being provided with a plurality of open grooves (1-6) distributed along the circumferential direction; the upper end of the annular protrusion (6-1) being provided with a plurality of clamping posts (6-1-2) corresponding to the open grooves (1-6) one by one; the face shell (1) making the open grooves (1-6) be detached from the clamping posts (6-1-2) from bottom to top under the action of elasticity of the spring (8); and when the face shell (1) is pressed, the clamping posts (6-1-2) stretching into the open grooves (1-6) to limit the rotation of the face shell (1) relative to the base (6).

5. The magnetic rotary buckle type vehicle-mounted holder according to claim 4, wherein the lower end of the face shell (1) is provided with a first guide cylinder (1-4) extending downward; the upper end of the base (6) is provided with a second guide cylinder (6-2) extending upward; the second guide cylinder (6-2) sleeves inside the first guide cylinder (1-4); the first guide cylinder (1-4) can rotate relative to the second guide cylinder (6-2) or move axially; the annular protrusion (6-1) is located at the inner side of the second guide cylinder (6-2); and the spring (8) is located in a space between the annular protrusion (6-1) and the second guide cylinder (6-2).

6. The magnetic rotary buckle type vehicle-mounted holder according to claim 2, wherein the adjacent clamping grooves (6-1-1) are in circular arc transition.

7. The magnetic rotary buckle type vehicle-mounted holder according to claim 2, wherein a guide hole (1-7) is formed in the bottom of the face shell (1); an inner guide cylinder (6-3) extending upward is provided on a middle part of the base (6); and the face shell (1) sleeves on the inner guide cylinder (6-3) through the guide hole (1-7).

8. The magnetic rotary buckle type vehicle-mounted holder according to claim 7, further comprising a fastener; the fastener being used for penetrating into the inner guide cylinder (6-3); and a limiting part being provided at the outer side of the upper end of the fastener to limit the detachment of the face shell (1) from the inner guide cylinder (6-3).

9. The magnetic rotary buckle type vehicle-mounted holder according to claim 1, wherein the face shell (1) comprises an upper cover (1-1) and a bottom plate (1-2); the upper cover (1-1) covers and is fixed on the bottom plate (1-2); and the magnet (3) is provided on an inner surface of the top of the upper cover (1-1).

10. The magnetic rotary buckle type vehicle-mounted holder according to claim 1, wherein the face shell (1) is provided with at least one marble (10) protruding upward, and the magnetic plate (5) is provided with positioning holes (5-1) for clamping the marbles (10).

\* \* \* \* \*